(12) United States Patent
Kocharyan et al.

(10) Patent No.: US 10,871,564 B2
(45) Date of Patent: Dec. 22, 2020

(54) VEHICULAR RADAR ASSEMBLY

(71) Applicant: Veoneer US, Inc., Southfield, MI (US)

(72) Inventors: Karen Kocharyan, Southfield, MI (US); Kai Yang, Southfield, MI (US); Andrew Oftedal, Southfield, MI (US)

(73) Assignee: Veoneer US, Inc., Southfield, MI (US)

( * ) Notice: Subject to any disclaimer, the term of this patent is extended or adjusted under 35 U.S.C. 154(b) by 224 days.

(21) Appl. No.: 16/054,385

(22) Filed: Aug. 3, 2018

(65) Prior Publication Data

US 2020/0041641 A1 Feb. 6, 2020

(51) Int. Cl.
| | | |
|---|---|---|
| *G01S 13/931* | (2020.01) | |
| *G01S 7/02* | (2006.01) | |
| *B60R 19/48* | (2006.01) | |
| *B60R 19/03* | (2006.01) | |

(52) U.S. Cl.
CPC ............ *G01S 13/931* (2013.01); *B60R 19/03* (2013.01); *B60R 19/483* (2013.01); *G01S 7/023* (2013.01); *G01S 2007/027* (2013.01); *G01S 2013/9325* (2013.01); *G01S 2013/93271* (2020.01); *G01S 2013/93272* (2020.01); *G01S 2013/93275* (2020.01)

(58) Field of Classification Search
CPC .................. G01S 13/931; G01S 7/023; G01S 2013/93275; G01S 2013/93271; G01S 13/93272; G01S 7/03; G01S 7/032; G01S 2013/93272; H01Q 1/405; H01Q 1/42; H01Q 1/421; H01Q 1/427
USPC .................................................. 342/70, 5, 7
See application file for complete search history.

(56) References Cited

U.S. PATENT DOCUMENTS

| | | | |
|---|---|---|---|
| 6,111,551 A | 8/2000 | Schmidt et al. | |
| 6,496,138 B1 | 12/2002 | Honma | |
| 6,937,184 B2 * | 8/2005 | Fujieda | ..................... G01S 7/03 342/1 |
| 7,126,525 B2 | 10/2006 | Suzuki et al. | |
| 7,218,266 B2 | 5/2007 | Fujieda et al. | |
| 9,610,912 B2 | 4/2017 | Schaaf | |
| 10,012,720 B2 * | 7/2018 | Emanuelsson | ....... H01Q 1/3291 |
| 2014/0070982 A1 * | 3/2014 | Inada | .................... B60R 19/483 342/188 |
| 2016/0268693 A1 * | 9/2016 | Ding | ..................... G01S 13/931 |

OTHER PUBLICATIONS

John E. Hill, Gain of Directional Antennas, Copyright @ 1976 Watkins-Johnson Company, vol. 3 No. 4 Jul./Aug. 1976, Revised and reprinted © 2001 WJ Communications, Inc. (Year: 1976).*

* cited by examiner

*Primary Examiner* — Erin F Heard
*Assistant Examiner* — Michael W Justice
(74) *Attorney, Agent, or Firm* — Burns & Levinson LLP; Steven M. Mills

(57) ABSTRACT

An assembly for a detection system for a vehicle in an environment has a radar sensor positioned around a central boresight axis. The radar sensor includes an RF board with at least one antenna and a support bracket configured to secure the detection system to the vehicle. The support bracket has sloped walls forming a radiation aperture between the RF board and the environment. The sloped walls have distal ends distal to the radar sensor. A plurality of sloped flaps extend from the distal ends and slope inwardly from the distal ends towards the boresight axis to intercept radiation within the radiation aperture.

17 Claims, 8 Drawing Sheets

VEHICULAR RADAR ASSEMBLY

FIELD OF THE INVENTION

The subject disclosure relates to vehicular radar and more particularly to support structures for vehicular radar.

BACKGROUND OF THE INVENTION

Vehicles often include detection systems which can be used for collision avoidance, self-driving, cruise control, and the like. The automotive radar sensors are installed in predefined locations in a car using mounting assemblies, often including brackets. The major function for these brackets is to provide a mechanical support to the sensor.

In typical detection systems, radar sensors are mounted behind the fascia of the vehicle. This results in some of the radiated power being reflected, from the fascia, back towards the sensor and the bracket, thus giving rise to multiple back-and-forth passes between the fascia and the bracket (known as "multi-path"). Multi-path results in radiation being trapped between the bracket and fascia. The multi-path effect is particularly strong for painted fascia because of the higher permittivity (Dk) of the paint.

Along with multi-path, other unwanted effects are caused by the fascia. For example, some fascia-reflected radiation can pass through the bracket walls, entering the internal compartments in a car, and after secondary reflections find its way back to the radar sensor. This effect is known as backscatter. Due to a longer path taken by RF beam via backscatter, backscatter can appear as a close object in the view of the sensor thus triggering a false alarm in the detection system. While an absorbent bracket can be used to block a backscatter, it can also cause additional unwanted multi-path due to increased reflection.

Conventional mounting assemblies have been ineffective in finding a simple solution to reducing multi-path and backscatter within a detection system.

SUMMARY OF THE INVENTION

In light of the needs described above, in at least one aspect, the subject technology provides a mounting assembly which is simple, inexpensive, and reduces the effects of multi-path and backscatter felt by a corresponding detection system.

In at least one aspect, the subject technology relates to an assembly for a detection system for a vehicle in an environment. The assembly includes a radar sensor positioned around a central boresight axis. The radar sensor includes an RF board with at least one antenna. The assembly further includes a support bracket configured to secure the detection system to the vehicle. The support bracket has sloped walls forming a radiation aperture between the RF board and the environment, the sloped walls including distal ends distal to the radar sensor. The support bracket also has a plurality of sloped flaps extending from the distal ends of the sloped walls and sloping inwardly from the distal ends towards the boresight axis to intercept radiation within the radiation aperture.

In some embodiments, an exterior layer of the support bracket is a metal material and an interior layer of the support bracket is an RF absorbent. The RF absorbent can be absorbent plastic. The thickness of the absorbent plastic can correspond to an odd number of quarter wavelengths in the absorbent plastic. In some embodiments, the sloped flaps are at an angle of substantially 90 degrees to the sloped walls. The sloped flaps can be angled such that radiation from the RF board contacts the sloped flaps at an angle substantially orthogonal to the sloped flaps. In some cases, the sloped flaps are angled to maintain an angle of incident with the RF board of less than 30 degrees. Further, the assembly can be configured such that the field of view is +/−75 degrees around the boresight axis. In some embodiments, the detection system detects objects within a field of view defined by a functional aperture, the functional aperture being less than the radiation aperture. In such a case, the sloped flaps terminate at a position to form an aperture in accordance with the functional aperture.

In at least one aspect, the subject technology relates to an assembly for a detection system for a vehicle in an environment. The assembly has a radar sensor positioned around a central boresight axis, the radar sensor having an RF board with at least one antenna. The assembly includes a support bracket configured to secure the detection system to the vehicle. The support bracket has sloped walls forming a radiation aperture between the RF board and the environment. The sloped walls include distal ends distal to the radar sensor and proximate ends proximate to the radar sensor. The sloped walls are configured to attach sloped flaps between the proximate and distal ends.

In some embodiments, the assembly includes a plurality of channels defined by the sloped walls between the proximate and distal ends, each channel configured to receive a sloped flap and maintain the flap at an angle with respect to the sloped wall such that the sloped flap extends inwardly towards the boresight axis. The assembly can include sloped flaps removably secured within each of the channels.

In some embodiments, the detection system detects objects within a field of view defined by a functional aperture, the functional aperture being less than the radiation aperture. In such cases, the sloped flaps terminate at a position to form an aperture in accordance with the functional aperture. The support bracket and the sloped flaps can be formed from a metal exterior layer and an absorbent interior layer. The thickness of the absorbent interior layer can correspond to an odd number of quarter wavelengths in the absorbent interior layer.

In at least one aspect, the subject technology relates to an assembly for a detection system for a vehicle in an environment. The assembly includes a support bracket configured to secure the detection system to the vehicle. The support bracket forms an aperture between a cavity for an RF board and the environment, the support bracket further including sloped walls with distal ends distal to the cavity. A plurality of sloped flaps extend from the distal ends and slope inwardly from the distal ends towards a boresight axis.

In some embodiments, the detection system detects objects within a field of view defined by a functional aperture, the functional aperture being smaller than the aperture formed by the sloped walls. In such cases, the sloped flaps terminate at a position to form an aperture in accordance with the functional aperture. In some embodiments, an exterior layer of the support bracket is a metal material and an interior layer of the support is an absorbent. In some embodiments, the thickness of the absorbent corresponds to an odd number of quarter wavelengths in the absorbent.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
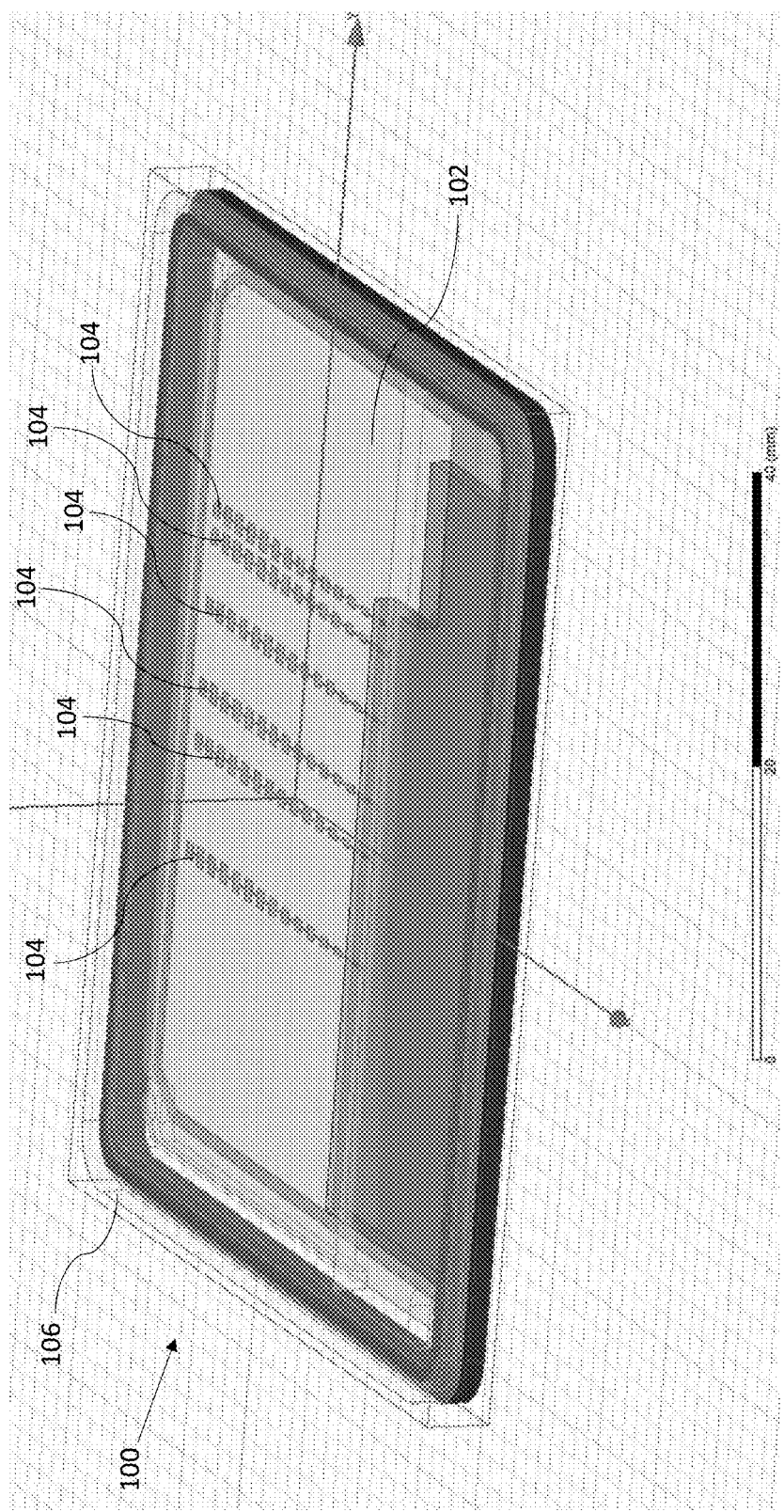
FIG. 1 is a perspective view of a conventional radar sensor for a detection system.

The subject technology overcomes many of the prior art problems associated with mounting assemblies in vehicle detection systems. In brief summary, the subject technology provides a mounting assembly which is designed to reduce the effects of multi-path and backscatter on a detection system, improving accuracy. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, a perspective view of a conventional radar sensor 100 for a detection system is shown. The radar sensor 100 includes an RF board 102 with six antennas 104 which transmit RF beams into a surrounding environment. A radome 106 covers the RF board 102. The radome 106 protects the RF board 102 but allows the RF beams from the antennas 104 to pass through into the environment unimpeded. Different numbers of antennas 104 can be used in various applications, as desired.

Figure 2:
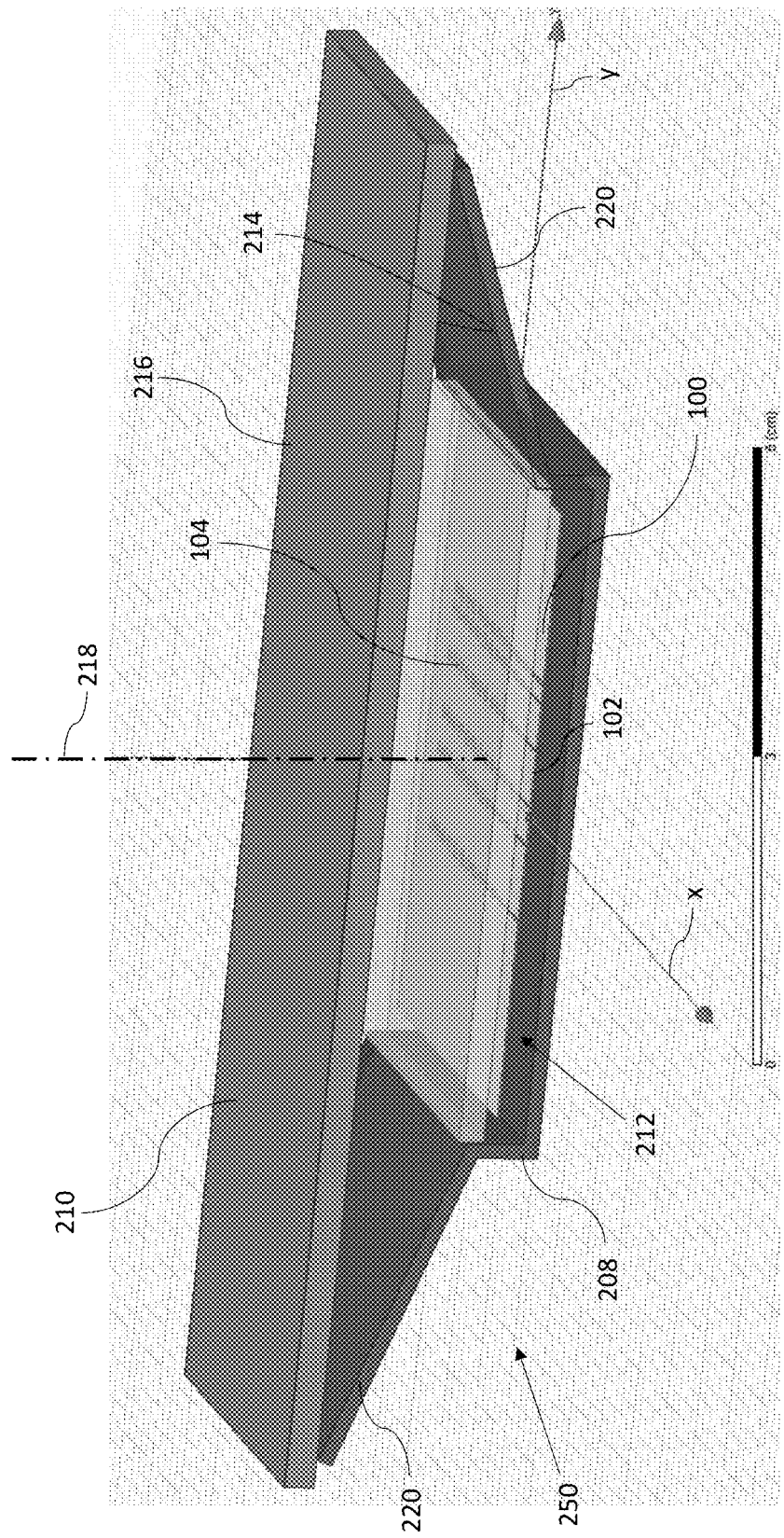
FIG. 2 is a perspective view of a conventional detection system.
Figure 3:
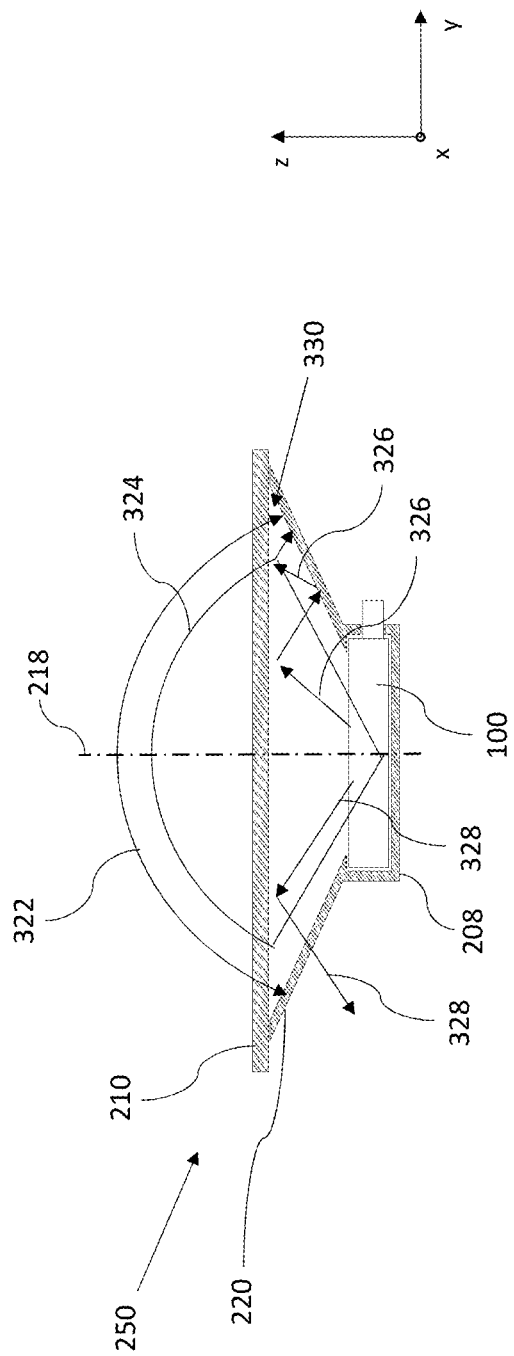
FIG. 3 is an overhead view of the conventional detection system of FIG. 2.

Referring now to FIGS. 2-3, perspective and overhead views, respectively, of a conventional detection system 250 are shown. Notably, some components required for operation of the detection system 250 are omitted from FIGS. 2 and 3, the figures instead showing the components most relevant to the subject technology. Also, for the simplicity, fascia 210 is shown as being a flat plate. Otherwise, in general, the detection system 250 operates in accordance with conventional detection systems as are known in the art, to assist a vehicle for collision avoidance, self-driving, cruise control, or the like.

The detection system 250 includes a support bracket 208 which is behind the fascia 210 of the vehicle. The support bracket 208 sits adjacent to the interior 214 of the fascia 210 of the vehicle. An exterior 216 of the fascia 210 adjacent to the environment surrounding the vehicle is painted. A radar sensor 100 is secured within an interior cavity 212 formed by the support bracket 208. The RF board 102 of the radar sensor 100 includes antennas 104 which transmit RF beams through the fascia 210 and into the surrounding environment. The support bracket 208 positions the radar sensor 100 such that the boresight axis 218 of the radar sensor 100 points to pre-defined direction in a vehicle coordinate system (e.g. orthogonal to the fascia 210).

The support bracket 208 includes sloped walls 220 which extend outwardly from the antenna board 100 towards the fascia 210. The sloped walls 220 extend away from the boresight axis 218 in the azimuth direction (e.g. along they axis) as they approach the fascia 210 to be outside of a keep-out-zone 322 in front of the radar sensor 100. Typically, the keep-out-zone is between +/−75 degrees in the azimuth direction and +/−10 degrees in the elevation direction (e.g. along the x axis) and is defined by a radiation aperture 324 of the radar beam between the RF radar sensor 100 and the environment. The radiation aperture 324 shows the angular extents of the main lobe both in azimuth and elevation for the beam radiated by the standalone radar sensor 100 (without bracket 208 and fascia 210). Depending on application necessities only a part of the main beam, referred to as a functional aperture, can be utilized in practice. Notably, and as will be discussed in more detail below, the functional aperture (i.e. the area through which radar beams are actually utilized by the detection system) tends to be smaller than the radiation aperture 324. This is because the sensors are typically designed to have the broadest available beam width to cover all possible application functions and scenarios. The support bracket 208 is typically made of a radiation transparent dielectric material such as TPO (thermoplastic olefin). However, it can be made also of an absorbent material, such as carbon loaded plastic like Witcom to help reduce backscattering. Witcom is a product of company Witcom Engineering Plastics which is located at Etten-Leur, the Netherlands. While the bracket 208 with sloped walls 220 is designed to avoid direct interference with the main lobe of RF beams of the radar sensor 100, when the radar sensor 100 is mounted behind the fascia 210 it gives rise to some undesirable effects on the detection system 250.

To that end, FIG. 3 shows exemplary illustrations of the path taken by undesirable multi-path 326 and backscatter 328 within the detection system 250. The multi-path beam 326 is initially transmitted from the RF board of the radar sensor 100 towards the fascia 210, as with other RF beams. However, in the case of a multi-path beam 326, the angle of incidence of the RF beam with the fascia 210 causes the multi-path beam 326 to deflect off the fascia 210 back towards the support bracket 208. Numerous other deflections can then occur as the multi-path beam 326 is repeatedly deflected between the fascia 210 and the support bracket 208. At times, this can result in the multi-path beam 326 effectively being trapped in the outer space 330 between the support bracket 208 and the fascia 210.

Still referring to FIG. 3, the undesirable effect of the backscatter 328 develops when the beam which was reflected from fascia 210 escapes the inner cavity 330 through the side walls 220 of the bracket 208. As mentioned above, the support bracket 208 shown can also be manufactured from an absorptive plastic which has high dielectric loss. This reduces the backscatter by attenuating the RF radiation which passes through the sloped walls 220. However, the absorptive materials tend to have also a higher dielectric constant (Dk) as compared to TPO which causes additional reflection from the walls resulting in stronger multi-path interference and trapping.

Figure 4:
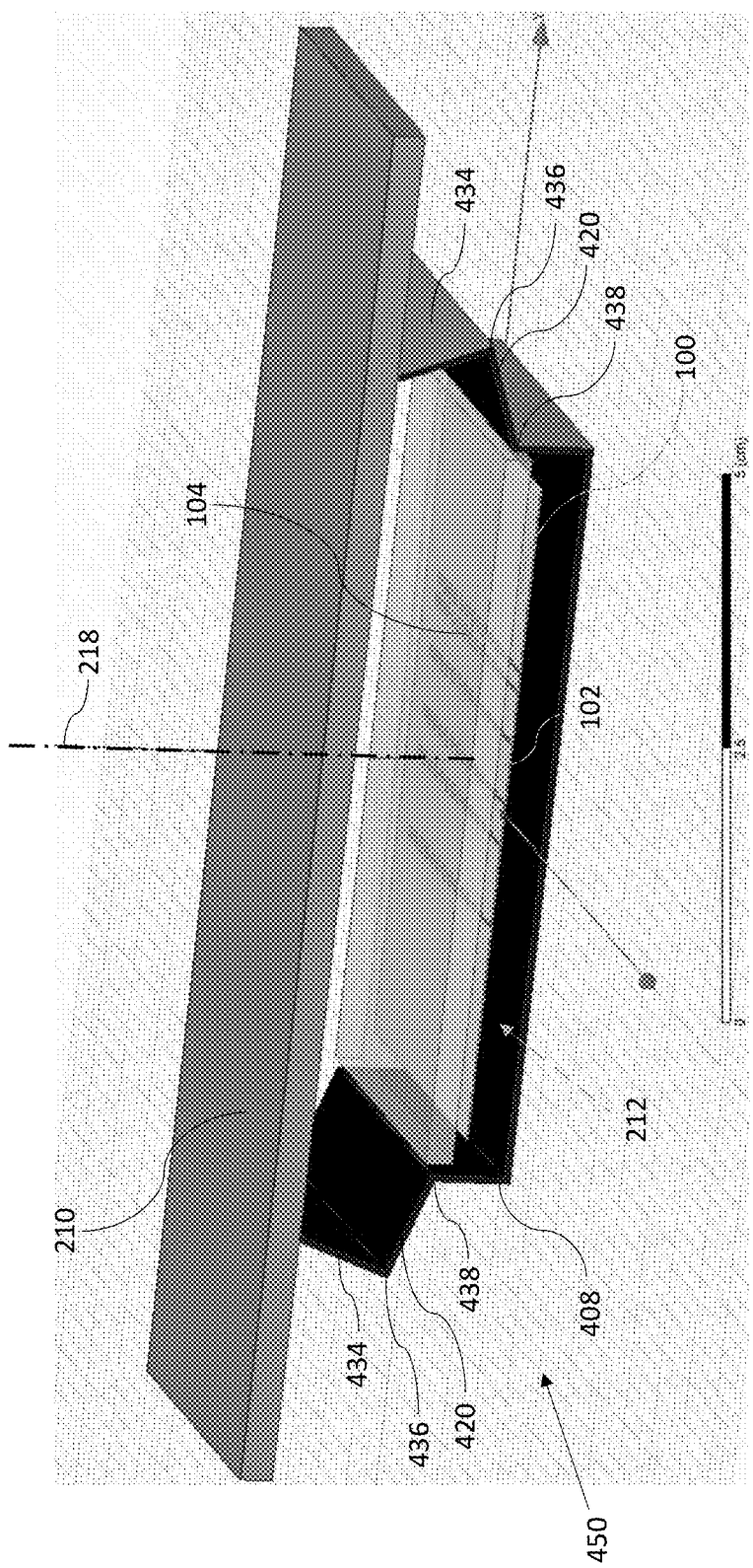
FIG. 4 is a perspective view of a detection system with a mounting assembly configured in accordance with the subject technology.
Figure 5:
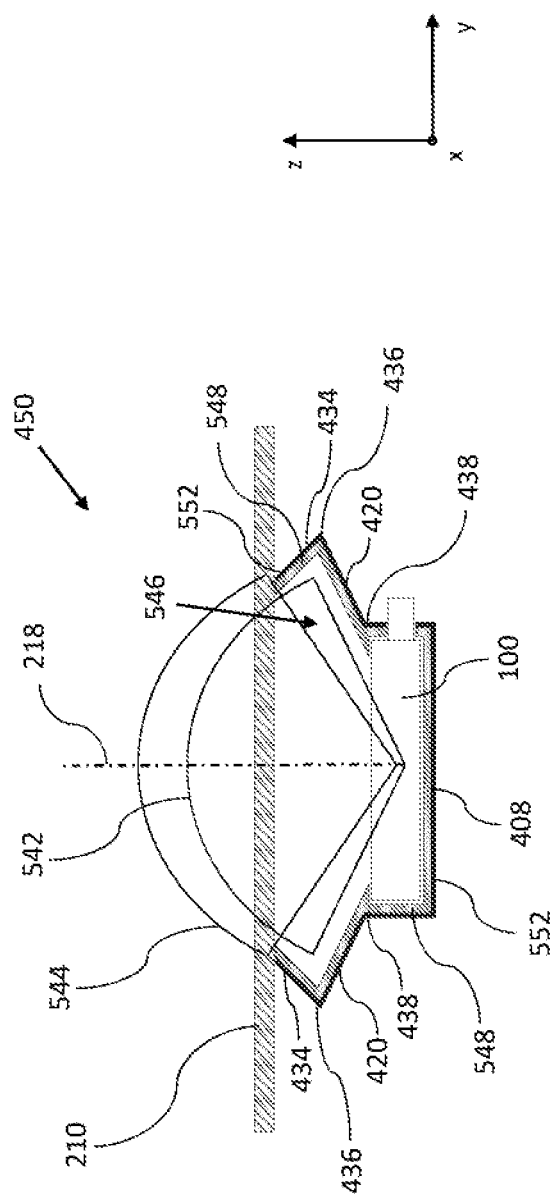
FIG. 5 is an overhead view of the detection system of FIG. 4.

Referring now to FIGS. 4-5, perspective and overhead views, respectively, of a detection system 450 in accordance with the subject technology are shown. As with FIGS. 2 and 3, various components required for operation of the detection system 450 are omitted from FIGS. 4 and 5, the figures instead showing the components most relevant to the subject technology. The system 450 also functions similarly to the system 250, except for the differences as discussed herein.

The system 450 uses a support bracket 408 which is formed from a material with two layers 548, 552 (as seen in FIG. 5). In particular, the support bracket 408 has an interior layer 548 which is made of absorbent dielectric material. The absorbent material can be a carbon loaded plastic like Witcom, or any other dielectric material which absorbs RF radiation at the frequency of radar operation. To deliver a required performance the absorbent layer should have resonant thickness t which depends on dielectric characteristics (Dk and tan d) of the absorbent material. Dk is the dielectric constant which is the indicative of how much the RF wave slows down in absorbent material as compared with the vacuum, while tan d is the loss tangent which is a measure of wave attenuation per wavelength. The resonant thickness t is the one which corresponds to the odd number of quarter wavelengths in absorbent material in that $t=((2n+1)\lambda/4*sqrt (Dk)$, where $n=0, 1, 2 \ldots$ ). In case of carbon loaded plastic Witcom (Dk=6.6 and tan d=0.15), thickness of absorbent layer 548 substantially 1 mm has been found to be effective. An exterior layer 552 of the support bracket 408 is a conductive material of arbitrary thickness which reflects RF radiation that penetrates the interior absorbent layer 548. The exterior layer 552 provides a metal backing which completely blocks the passing of all radiation, preventing any from passing through the support bracket 408 and into the vehicle. The radiation which is reflected from the surface of the absorbent layer 548 is cancelled by the radiation reflected by the metal layer 552 due to accumulated 180° phase shift. Therefore, the metal-backed resonant absorber creates a low-reflectivity opaque wall. The low reflectivity due to the phase cancellation can be maintained below −15 dB if the angle of wave incidence doesn't exceed 30 degrees with respect to the normal incidence. So, any radiation within that range of incident angles doesn't reflect and is fully absorbed in the bracket 408. In this way, the material and shape of the support bracket 408 (including the sloped walls 420 and sloped flaps 434) causes unwanted RF radiation outside the intended field of view to be absorbed without reflection.

In the system 450, the mounting assembly includes a support bracket 408 that has sloped sidewalls 420 as well as a plurality of sloped flaps 434. The sloped sidewalls 420 differ from the conventional sloped sidewalls 220 in that the sloped sidewalls 420 terminate at distal ends 436 prior to contacting the fascia 210. The length and angle of the sloped walls 420, as well as the length and angle of the sloped flaps 434 with respect to the sloped walls 420, define the field of view of the detection system 450. These lengths and angles can be modified to obtain a particular field of view, as desired. In the exemplary system 450 the distal ends 436 of the sloped sidewalls 420 are less than halfway between the beginning, or proximate ends 438 of the sloped sidewalls 440 and the fascia 210. The sloped flaps 434 extend from the distal ends 436 at an angle which ensures close to normal incidence for the beams traveling from the radar sensor 100 toward the flaps 434.

Each detection system shown herein has both a radiation aperture 542 and a functional aperture 544 (see FIG. 5). The radiation aperture 542 represents the area which extends to cover the angular spread of radiation generated by the radar sensor 100. However, the entire range of the radiation aperture 542 is not relied upon to generate fields of view for the detection systems. Instead, a smaller functional aperture 544 is relied upon. The radiation within the excess area 546 (i.e. the radiation that is within the radiation aperture 542 but outside of the functional aperture 544) is excess, or peripheral radiation. This peripheral radiation is generally not relied by the detection system since the true field of view tends to be only generated by radiation within the function aperture 544. In the example shown, the sloped flaps 434 are sloped to define a field of view in accordance with the functional aperture 544 of the detection system. More specifically, since the flaps 434 extend into the area of the radiation aperture 542 without causing reflections, effectively narrowing the beam in azimuth to shape the functional aperture 544 needed for application. In this way, the sloped flaps 434 are configured to avoid blocking any radiation in the functional aperture 544. Instead, the sloped flaps 434 approach the fascia 210 at a location that allows radiation within the functional aperture 544 to pass through the fascia 210 and into the environment, while blocking the excess 546 within the radiation aperture 542.

The double layered sloped flaps 434 can be configured to be substantially orthogonal to the excess radiation 546 being given off by the radar sensor 100. This ensures the excess radiation 546 approaches the sloped flaps 434 close to normal incidence conditions, which allows the non-reflective absorbent layer 548 to absorb as much excess radiation as possible. By eliminating the radiation outside of functional aperture 544, the potential of development of backscatter and multipath is further reduced. As such, the mounting assembly of the system 450 is able to hold the radar sensor 100 in place while preventing the trapping effects, eliminating the backscatter, and suppressing the unwanted peripheral rays.

Figure 6:
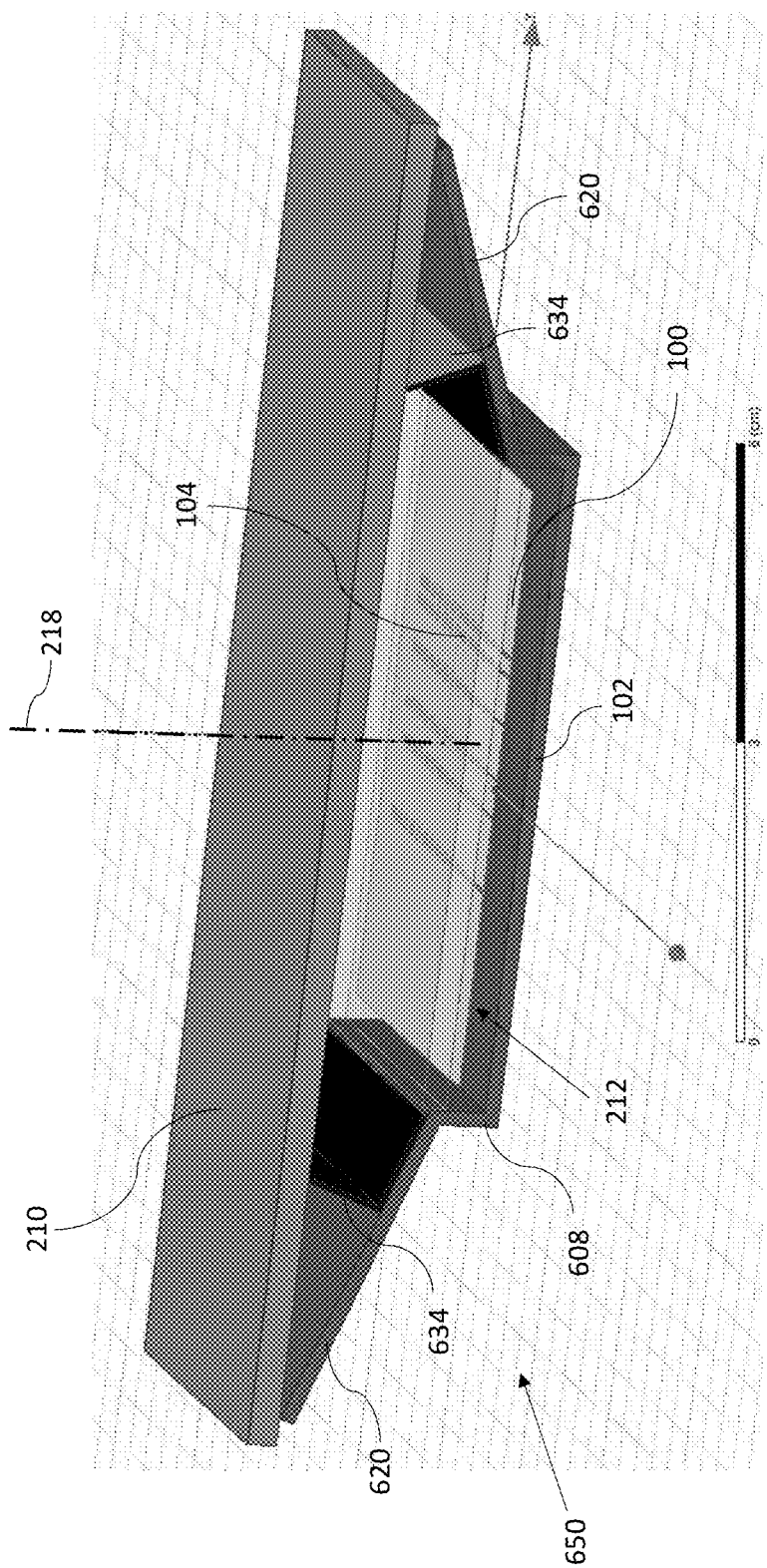
FIG. 6 is a perspective view of another embodiment of a detection system with a mounting assembly configured in accordance with the subject technology.

Referring now to FIG. 6, a perspective view of another embodiment of a detection system 650 with a mounting assembly in accordance with the subject technology is shown. The detection system 650 functions similarly to the other systems 250, 450, except as described herein. As with the conventional system 250, the sloped sidewalls 620 of the system 650 extend all the way to the fascia 210. However, unlike the conventional bracket 208, the support bracket 608 is configured to allow attachment of sloped flaps 634 in accordance with the subject technology. For example, the sloped sidewalls 620 can include channels (not distinctly shown) which allow sloped flaps 634 to be slidably inserted into the sloped sidewalls 620 with ease. The sloped flaps 634 can be configured and arranged in accordance with any of the sloped flaps discussed herein. To that end, the sloped sidewalls 620 can include support mechanisms arranged to removably hold the sloped flaps 634 in any of the positions of the other support flaps described herein. As such, when the sloped flaps 634 are attached to the sloped sidewalls 620, the system 650 works to reduce backscatter, multipath, and trapping. As with the system 450, the entire support bracket 608, or the portion of the support bracket 608 which fronts the radar sensor 100, can be formed from a metal exterior layer and a non-reflective absorbent interior layer of resonant thickness.

Figure 7:
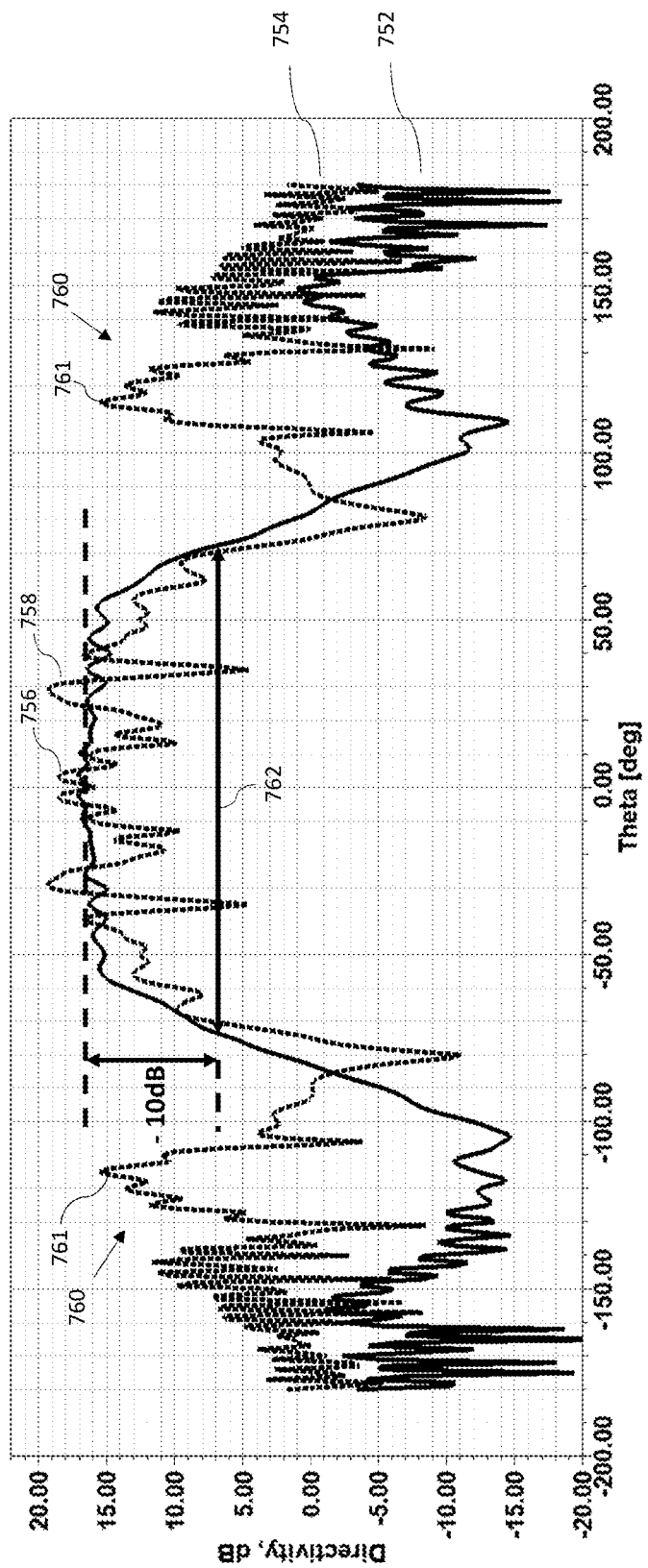
FIG. 7 is a graph showing different angles in the azimuth direction for both a standalone sensor and a sensor on a vehicle in accordance with a conventional system.

Referring now to FIG. 7, a graph of radiated power across the azimuth angles is shown both for a standalone sensor as well as for the system including the fascia and the bracket accordance to the conventional design. In the example given, the radar sensors are operating at a frequency of 76.5 GHz. The solid line 752 represents an azimuth antenna pattern radiated by the standalone radar sensor, while the dotted line 754 shows the antenna pattern for the sensor mounted behind of the fascia using the conventional bracket. The placement of the fascia in front of the sensor gives rise of some strong ripples (e.g. ripples 756, 758) in the antenna pattern 754. The low amplitude frequent oscillations in the frontal view represented by ripple 756 are due to the multipath, while the high amplitude slow oscillations represented by ripple 758 are due to the direct sensor-fascia interaction. Also, the strong and broad signals 760 appear at high azimuth angles due to backscatter. The azimuthal spread of power at the level of −10 dB below the max power is the radiation aperture 762. According to the graphs in FIG. 7, the radiation aperture 762 for the standalone sensor and for the sensor mounted behind the fascia using a bracket of conventional design is substantially the same. In the given example the radiation aperture 762 extends to about ±75 degrees.

Figure 8:
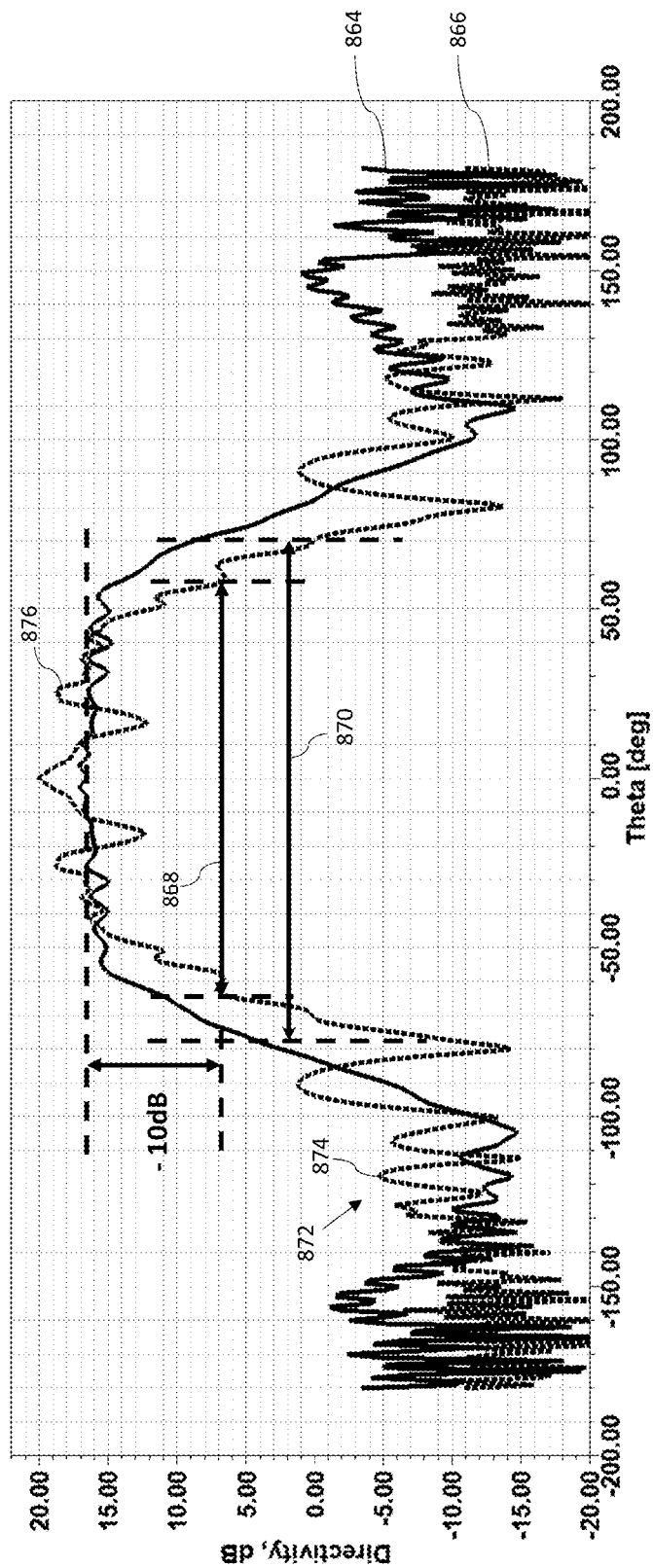
FIG. 8 is a graph showing different angles in the azimuth direction for both a standalone sensor and a sensor on a vehicle in accordance with the subject technology.

Referring now to FIG. 8, a graph of radiation pattern across azimuth angles is shown both for a standalone sensor and a system in accordance with the subject technology. The solid line 864 represents the antenna pattern for a standalone radar sensor, while the dotted line 866 represents the pattern for a sensor mounted behind the fascia using a bracket assembly in accordance with the subject technology. In the example given, the radar sensors are operating at a frequency of 76.5 GHz. The dotted line 864 shows the functional aperture 866 which is formed by the bracket according to the subject technology to meet particular application requirements. The functional aperture 868 for the bracket according to subject technology is narrower than the radiation aperture 870 for the standalone sensor. In the shown example, the radiation and functional apertures 870, 868 are ±75 degrees and ±55 degrees, respectively.

Referring now to FIGS. 7-8, for the system in accordance with the subject technology, at the azimuth angles outside of functional aperture 868 the backscatter 872 is reduced by at least 20 dB as compared to the backscatter 760 of the conventional system. Where backscatter 760 spikes (see e.g. peaks 761), at around +/−120 degrees, the conventional system experiences a signal power of roughly 15 dB, while over that same area (e.g. peak 874) the system of the subject technology experiences a signal power of only around −5 dB. Additionally, sharp ripples 756 due to multipath which were present in the antenna pattern for the conventional system are significantly suppressed when using the bracket assembly according to the subject technology. This reveals the slow oscillations 876 (see also 758 in FIG. 7) which are the result of direct interaction between the sensor and fascia.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. sensors, antennas, supports, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. An assembly for a detection system for a vehicle in an environment comprising:
   a radar sensor positioned around a central boresight axis, the radar sensor comprising an RF board with at least one antenna; and
   a support bracket configured to secure the detection system to the vehicle, the support bracket comprising:
   sloped walls forming a radiation aperture between the RF board and the environment, the sloped walls including distal ends distal to the radar sensor; and
   a plurality of sloped flaps extending from the distal ends and sloping inwardly from the distal ends towards the boresight axis to intercept radiation within the radiation aperture, the sloped flaps forming a functional aperture that is smaller than the radiation aperture, wherein the detection system detects objects within a field of view defined by the functional aperture.

2. The assembly of claim 1, wherein an exterior layer of the support bracket is a metal material and an interior layer of the support bracket is an RF absorbent.

3. The assembly of claim 2, wherein the RF absorbent is absorbent plastic.

4. The assembly of claim 3, wherein the thickness of the absorbent plastic corresponds to an odd number of quarter wavelengths in the absorbent plastic.

5. The assembly of claim 1, wherein the sloped flaps are at an angle of 90 degrees to the sloped walls.

6. The assembly of claim 1, wherein the sloped flaps are angled such that radiation from the RF board contacts the sloped flaps at an angle substantially orthogonal to the sloped flaps.

7. The assembly of claim 1 wherein the sloped flaps are angled to maintain an angle of incident with the RF board of less than 30 degrees.

8. The assembly of claim 7, wherein the field of view is +/−75 degrees around the boresight axis.

9. An assembly for a detection system for a vehicle in an environment comprising:
   a radar sensor positioned around a central boresight axis, the radar sensor comprising an RF board with at least one antenna; and
   a support bracket configured to secure the detection system to the vehicle, the support bracket having sloped walls forming a radiation aperture between the RF board and the environment, the sloped walls including distal ends distal to the radar sensor and proximate ends proximate to the radar sensor,
   wherein:
   the sloped walls are configured to attach sloped flaps between the proximate and distal ends such that the sloped flaps extend inwardly from the distal ends towards the boresight axis to intercept radiation within the radiation aperture and form a functional aperture, the functional aperture smaller than the radiation aperture; and
   the detection system is configured to detect objects within a field of view defined by the functional aperture.

10. The assembly of claim 9, further comprising a plurality of channels defined by the sloped walls between the proximate and distal ends, each channel configured to receive a sloped flap and maintain the flap at an angle with respect to the sloped wall such that the sloped flap extends inwardly towards the boresight axis.

11. The assembly of claim 10, further comprising a sloped flap removably secured within each of the channels.

12. The assembly of claim 9, wherein the support bracket and the sloped flaps are formed from two layers comprising: a metal exterior layer; and an absorbent interior layer.

13. The assembly of claim 12, wherein the thickness of the absorbent interior layer corresponds to an odd number of quarter wavelengths in the absorbent interior layer.

14. An assembly for a detection system for a vehicle in an environment comprising:
  a support bracket configured to secure the detection system to the vehicle, the support bracket having sloped walls forming a radiation aperture between a cavity for an RF board and the environment, the sloped walls having distal ends distal to the cavity; and
  a plurality of sloped flaps extending from the distal ends and sloping inwardly from the distal ends towards a boresight axis, the sloped flaps forming a functional aperture that is smaller than the radiation aperture, wherein the detection system detects objects within a field of view defined by the functional aperture.

15. The assembly of claim 14, wherein:
  the detection system detects objects within a field of view defined by the functional aperture; and
  the sloped flaps terminate at a position to form the functional aperture.

16. The assembly of claim 15, wherein an exterior layer of the support bracket is a metal material and an interior layer of the support is an absorbent.

17. The assembly of claim 15, wherein the thickness of the absorbent corresponds to an odd number of quarter wavelengths in the absorbent.

* * * * *